United States Patent
Mai et al.

(10) Patent No.: US 9,205,525 B2
(45) Date of Patent: Dec. 8, 2015

(54) SYSTEM AND METHOD FOR OFFSETTING MEASUREMENT OF MACHINE TOOL

(71) Applicant: INDUSTRIAL TECHNOLOGY RESEARCH INSTITUTE, Hsinchu (TW)

(72) Inventors: Chao-Chuang Mai, Taichung (TW); Chih-Ping Cheng, Miaoli County (TW); Chang-Sheng Chen, Kaohsiung (TW); Chin-Hui Chen, Taichung (TW); Chia-Sheng Chiang, Changhua County (TW)

(73) Assignee: INDUSTRIAL TECHNOLOGY RESEARCH INSTITUTE-TAIW, Hsinchu (TW)

( * ) Notice: Subject to any disclaimer, the term of this patent is extended or adjusted under 35 U.S.C. 154(b) by 416 days.

(21) Appl. No.: 13/852,431

(22) Filed: Mar. 28, 2013

(65) Prior Publication Data
US 2014/0130571 A1 May 15, 2014

(30) Foreign Application Priority Data
Nov. 9, 2012 (TW) .............................. 101141894 A (51) Int. Cl.
*B23Q 17/09* (2006.01)

(52) U.S. Cl.
CPC .................................. *B23Q 17/0923* (2013.01)

(58) Field of Classification Search
None
See application file for complete search history.

(56) References Cited

U.S. PATENT DOCUMENTS

| | | | |
|---|---|---|---|
| 3,878,983 A | 4/1975 | Hamill, III et al. | |
| 4,533,286 A | 8/1985 | Kishi et al. | |
| 5,079,713 A | 1/1992 | Kawamura et al. | |
| 6,157,869 A | 12/2000 | Matsumura et al. | |
| 7,905,682 B2 | 3/2011 | Holl et al. | |
| 2002/0045968 A1 | 4/2002 | Nakamura | |
| 2004/0225484 A1 | 11/2004 | Hamann | |
| 2006/0289086 A1 | 12/2006 | Rinfret et al. | |

FOREIGN PATENT DOCUMENTS

| | | |
|---|---|---|
| CN | 1141014 A | 1/1997 |
| CN | 1461428 | 12/2003 |
| CN | 1562563 A | 1/2005 |

(Continued)

OTHER PUBLICATIONS

Taiwan Patent Office, Office Action, Patent Application Serial No. TW101141894,Feb. 10, 2015, Taiwan.
Application to Offset and Compensation of Cutter of CNC Lathe, *Baidu* Oct. 10, 2011, Fig 8.2.1, 8.2.3, 8.2.5; Spec Chapter 1.2.1-1.2.2.
Huang et al., Research of CNC tool offset in machining center, *Journal of Shaoyang University(Natural Science Edition)*, Sep. 2007, Fig 3; Specification Chapter 1.2, 2.2; Abstract.
ProDuctivity+ Active Editor Pro 2008, Spec, p. 4, 7, 11.

(Continued)

*Primary Examiner* — Robert R Raevis
(74) *Attorney, Agent, or Firm* — Rabin & Berdo, PC (57) ABSTRACT

A method and a system, for offsetting measurement of machine tool, includes following steps. A tool seat is chosen, a first coordinate is set based on a first datum mark of the tool seat. There is a total tool seat assembling length in between the first datum mark and the tool seat. A tool is chosen, assembled in the tool seat, and includes a total tool length. A second coordinate is set based on a second datum mark of a measuring unit. The tool seat is moved to make a machining end of the tool contact with the second coordinate to obtain a relative total length in between the first and the second coordinate. The total tool length subtracts from the relative total length equals an assembled offset length. The total tool seat assembling length subtracts from the relative total length equals and obtains a tool assembling length.

14 Claims, 6 Drawing Sheets

(56) References Cited

FOREIGN PATENT DOCUMENTS

| | | |
|---|---|---|
| CN | 201036843 Y | 3/2008 |
| CN | 101574781 A | 11/2009 |
| CN | 101758422 A | 6/2010 |
| CN | 201744761 U | 2/2011 |
| CN | 102033509 A | 4/2011 |
| CN | 102265228 A | 11/2011 |
| JP | 57-069313 A | 4/1982 |
| JP | 2012061570 A | 3/2012 |
| TW | 156256 | 4/1991 |
| TW | 200637685 A | 11/2006 |
| TW | I301435 B | 10/2008 |
| TW | M355780 U | 5/2009 |
| TW | 201014676 A | 4/2010 |
| TW | 201021962 A | 6/2010 |
| TW | 201024023 A | 7/2010 |
| TW | 201026428 A | 7/2010 |
| TW | I330303 B1 | 9/2010 |
| TW | M408438 U1 | 8/2011 |
| TW | I363669 B | 5/2012 |

OTHER PUBLICATIONS

Cheng et al., Principles and Methods of presetting cutter in a NC Lathe, School of Agriculture Engineering,Nanging Agriculture University, China, 2002 Full Text and Fig.

Li et al., Implementation of Compensation of Tool and Milling Based on Different Numerical Control Milling System, *J. Jianghan Univ. (Nat. Sci. Ed.)* Jun. 2011, Full Text and Fig.

Sata, "Error Measurement and Calibration of Five Axis CNC Machine using Total Ball Bar Device", International Conference and Workshop on Emerging Trends in Technology (ICWET 2010), pp. 660-662, 2010.

Lauwers et al., "Optimal and collision free tool posture in five-axis machining through the tight integration of tool path generation and machine simulation", Computer-Aided Design, vol. 35, pp. 421-432, 2003.

Altintas et al., "Virtual Machine Tool", CIRP Annals—Manufacturing Technology, vol. 54, Issue 2, pp. 115-138, 2005.

Fan et al., "Intelligent planning of CAD-directed inspection for coordinate measuring", Computer Integrate Manufacturing Systems, vol. 11, No. 1-2, pp. 43-51, 1998.

Office Action of SIPO Application No. 201210581603.6 issued Sep. 1, 2015.

SYSTEM AND METHOD FOR OFFSETTING MEASUREMENT OF MACHINE TOOL

CROSS-REFERENCE TO RELATED APPLICATIONS

This non-provisional application claims priority under 35 U.S.C. §119(a) on Patent Application No(s). 101141894 filed in Taiwan, R.O.C. on Nov. 9, 2012, the entire contents of which are hereby incorporated by reference.

TECHNICAL FIELD

The disclosure relates to a system and a method for measurement.

BACKGROUND

In the recent years, many machine tool manufacturers have introduced five-axis machine tools, lathe and milling complex machine tools equipped with intelligent system. For machine tools, the way for preventing collision between mechanism moving elements is an important issue. Increase in complexity of mechanism and machining curved surfaces along with problems in programming will cause over cutting easily and even damages of tools and workpieces. Additionally, after collision between mechanism moving elements, the precision of mechanism elements may be reduced so that it is difficult to adjust back to original condition.

Therefore, the development of preventing collision devices is highly demanded. Devices for preventing collision are classified into a hardware for monitoring and preventing collision and a three-dimensional (3D) preventing collision software. The hardware for monitoring and preventing collision includes sensors installed at certain positions and signals are sent back to controllers to carry out corresponding measurements for preventing collision. The 3D preventing collision software employs hierarchical boundary area computing to design mechanisms for preventing collision; and to adjust the size of 3D envelope volume based on related machine information and machining conditions such that the probability of collision may be predicted to send out alarms to interrupt the machining.

However, the length of tool and the offset relative to the datum mark of tool seat have to be set in the 3D preventing collision software from the user end in order that the 3D preventing collision software is able to draw the geometrical relationship between the tool and the machine precisely, and interference inspection is carried out based on the machining procedures. Therefore, it is very inconvenient for users. Furthermore, a gripper and a cutting machine are usually included in a conventional machine tool system. The gripper is used for gripping a workpiece such that the workpiece can be machined. The cutting machine has a plurality of tool seats. Tools are installed in the tool seats when using the machine tool system. And the tool in one of the tool seats is selected for machining the workpiece.

Before performing machining, a simulation unit is used for simulating the conditions of the workpiece being machined by the tool. Afterwards, the tool is used to machine the workpiece based on the simulation results. However, when the tool is installed in the tool seat, offset errors may occur in the installation. Therefore, imprecise simulation results may occur during the simulation process. Even more imprecise machining results may occur if the workpiece is machined by the tool based on these simulation results. Different offset errors may also exist in the tools in each of the tool seats. Errors of the workpiece will greatly increase after being machined by various different tools. Therefore, failed machined products are produced.

SUMMARY

An embodiment of the disclosure provides a method for offsetting measurement of machine tool. The method comprises the following steps. At least a tool seat is chosen, a first coordinate is set based on a first datum mark of the tool seat. There is a total tool seat assembling length in between the first datum mark of the tool seat and an end surface of the tool seat. At least a tool is chosen, the tool is assembled in the tool seat, and the tool includes a total tool length. A measuring unit is provided, and a second coordinate is set based on a second datum mark of the measuring unit. The tool seat is moved along at least an axial direction to make a machining end of the tool contact with the second coordinate so as to obtain a relative total length in between the first coordinate and the second coordinate in the axial direction. The total tool length is subtracted from the relative total length to obtain an assembled offset length, and the total tool seat assembling length is subtracted from the relative total length to obtain a tool assembling length.

Another embodiment of the disclosure provides a system for offsetting measurement of machine tool. At least a tool is installed in at least a tool seat. The apparatus comprises a motion controlling unit, a simulation unit, a machine storage unit, a tool storage unit and a measuring unit. The motion controlling unit is used for controlling displacement movements of the tool seat. The simulation unit is used for showing simulation movements of the tool and the tool seat. The machine storage unit is used for storing a total tool seat assembling length of the tool seat. The tool storage unit is used for storing a total tool length of the tool. The measuring unit is used for measuring actual positions of the tool and the tool seat, obtaining a tool assembling length based on the total tool seat assembling length, inputting the tool assembling length to the simulation unit, obtaining an assembled offset length based on the total tool length, and for inputting the assembled offset length to the motion controlling unit and the simulation unit.

BRIEF DESCRIPTION OF THE DRAWINGS

The disclosure will become more fully understood from the detailed description given herein below for illustration only, and thus does not limit the disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
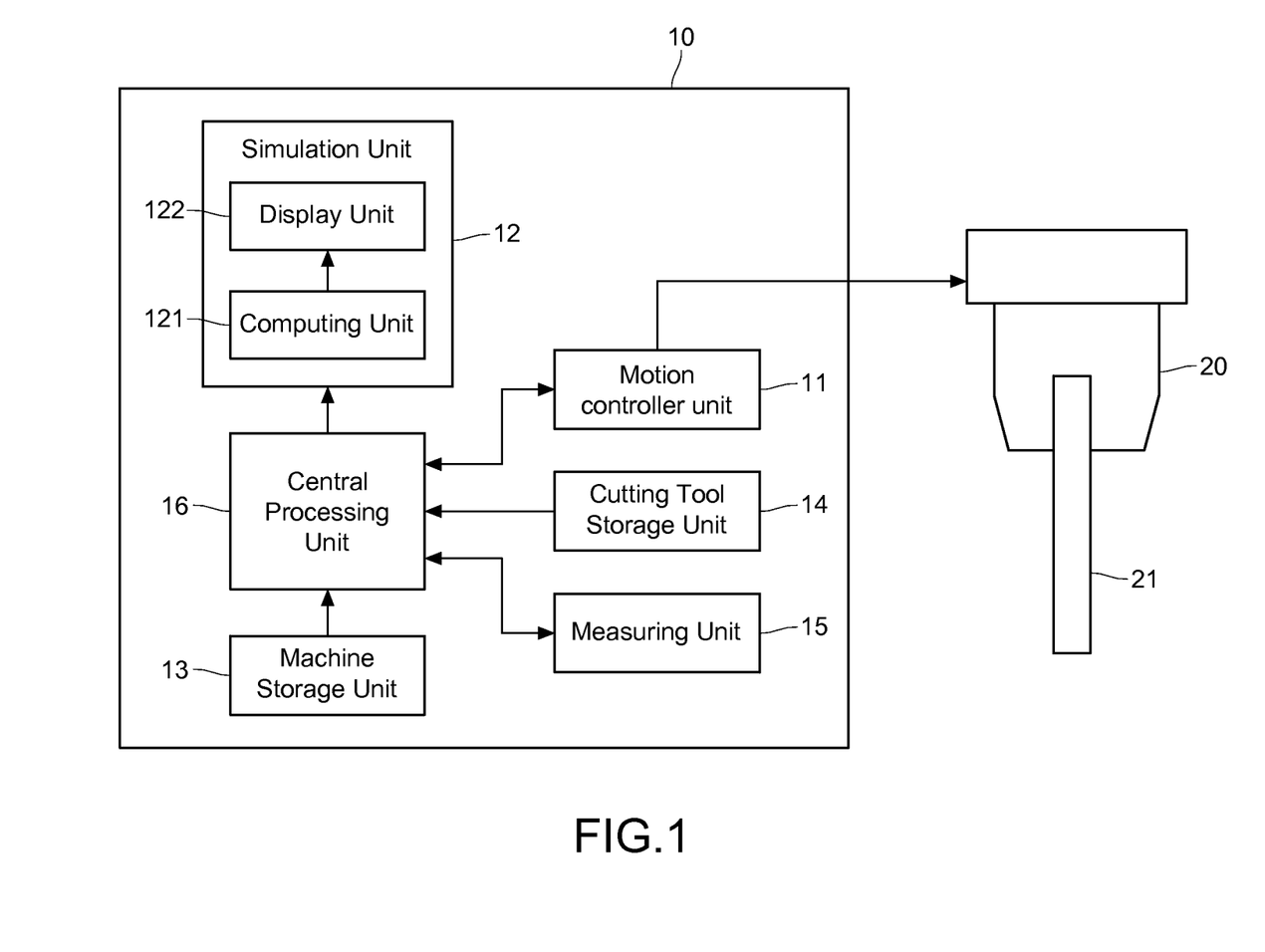
FIG. 1 is a framework diagram of a system for offsetting measurement of machine tools according to an embodiment of the disclosure.

Please refer to FIG. 1, which is a framework diagram of a system 10 for offsetting measurement of machine tools according to an embodiment of the disclosure. The system 10 for offsetting measurement of the machine tools comprises a motion controlling unit 11, a simulation unit 12, a machine storage unit 13, a tool storage unit 14, a measuring unit 15 and a central processing unit 16.

The motion controlling unit 11 is connected to the central processing unit 16, and the motion controlling unit 11 is used for controlling movements and maintaining coordinates of a machine tool. In this embodiment, for example, the motion controlling unit 11 controls displacement movements of at least one of tool seats 20 in X, Y and Z axial directions. Each of the tool seats 20 is installed with a tool 21 (i.e., cutting tool) corresponding to each other.

The simulation unit 12, connected to the central processing unit 16, is used for displaying simulating movements of the tool 21 and the tool seats 22. The simulation unit 12 comprises a computing unit 121 and a display unit 122. The computing unit 121 is used for providing three-dimensional (3D) geometrical drawing functions, such as, computing simulated movement processes of the tool seat 20 and its tool 21 during cutting. The display unit 122 constructs simulated conditions of the tool seat 20 and its tool 21 for 3D cutting and collision prevention.

The machine storage unit 13 is connected to the central processing unit 16, and the machine storage unit 13 is used for providing storage for storing the machine tool information. The machine tool information includes machine geometrical configurations, mechanism kinematic chain, tool module, jig module, workpiece module, etc, but the disclosure is not limited thereto. The machine tool information is used as geometrical information required in constructing on-line simulation for cutting and collision prevention. In this embodiment, the geometrical information of at least one of the tool seats 20, such as a total tool seat assembling length of each of the tool seats 20, may be stored in the machine storage unit 13. In other words, there is the total tool seat assembling length in between the first datum mark of the tool seat and an end surface of the tool seat.

The tool storage unit 14 is connected to the central processing unit 16. The tool storage unit 14 is used for storing geometrical information of the tools with various specifications and their offset information after measurement. For example, the information, stored in the tool storage unit 14, may be a total tool length of each of the tools 21.

The measuring unit 15 is connected to the central processing unit 16, and the measuring unit 15 is used for providing an actual tool assembling length and offset information after measurements for the central processing unit 16 and the motion controlling unit 11. Therefore, the central processing unit 16 carries out an interference inspection, and the motion controlling unit 11 carries out offsetting (namely, compensation) for the tool 21 during machining. In other words, the measuring unit 15 is used for measuring actual positions of the tool 21 and the tool seats 22, for obtaining the tool assembling length based on the total tool seat assembling length and inputting the tool assembling length to the simulation unit 15, and for obtaining an assembled offset length based on the total tool length and inputting the assembled offset length to the motion controlling unit 11 and the simulation unit 12.

The central processing unit 16 is used for executing materials removal and computing of machine movements. The computing unit 121 is used for performing computing of 3D drawing based on the computed information, and therefore the result of the 3D drawing is displayed by the display unit 122.

The method for offsetting measurement in the disclosure is described hereinafter. Please refer to FIG. 2, which is a schematic view of the tool 21 in FIG. 1 being installed in the tool seat 20 under an ideal condition. For the convenience of description, X, Y and Z indicated in the drawing are an X axial direction, a Y axial direction and a Z axial direction respectively. The X axial direction, the Y axial direction and the Z axial direction are perpendicular to each other.

Figure 2:
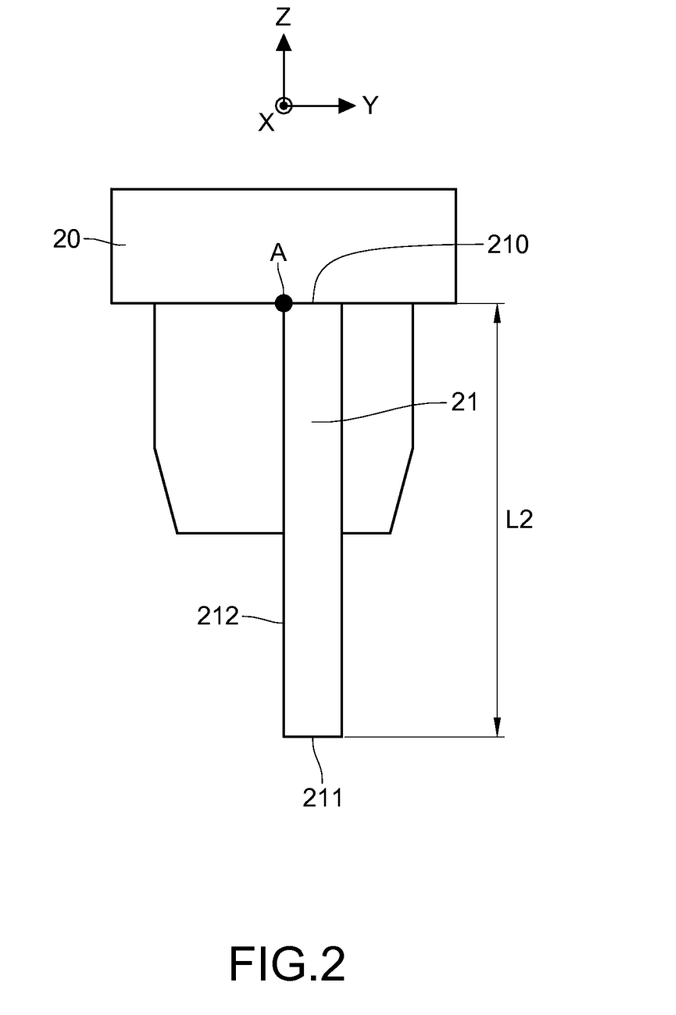
FIG. 2 is a schematic view of a tool in FIG. 1 being installed in a tool seat under an ideal condition.

Under the ideal condition, an installation portion 210 of the tool 21 is installed at a first coordinate A set with a first datum mark of the tool seat 20. Along the Z axial direction, a distance in between a first machining end 211 of the tool 21 and the first coordinate A is equal to a total tool length L2 of the tool 21. Along the Y axial direction, a second machining end 212 of the tool 21 superimposes (namely, coincides with) the first coordinate A.

However, it is usually unable to achieve the ideal condition, and deviation exists when installing the tool 21 into the tool seat 20 for the next time. Therefore, the method for offsetting measurement in the disclosure is used for measuring the deviation in order to compensate the position of the tool 21 during simulation and machining. Thereby, errors are avoided in simulation and machining caused by the deviation.

Figure 3:
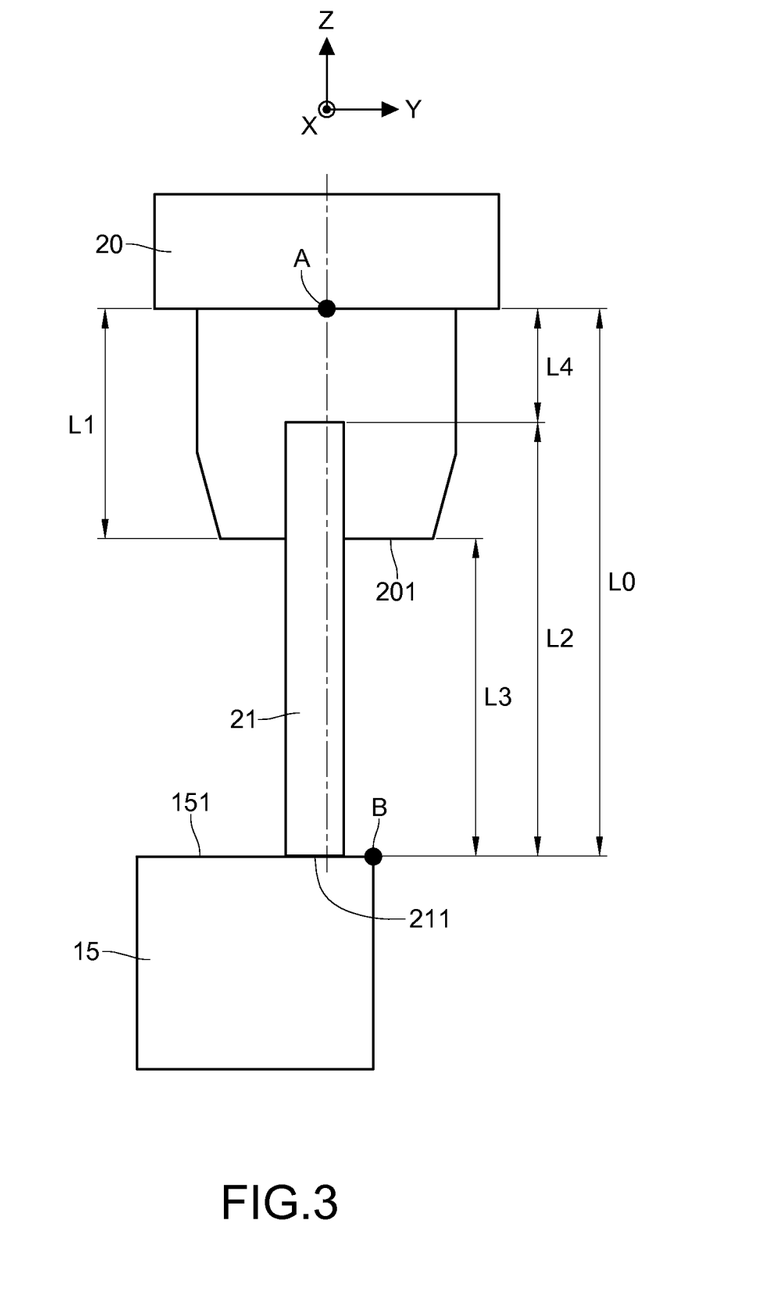
FIG. 3 is a schematic view of using the system for offsetting measurement of the machine tools in FIG. 1 to perform a method for offsetting measurement of the machine cutting tools in a Z axial direction.

Please refer to FIG. 3, which is a schematic view of using the system 10 for offsetting measurement of the machine tools in FIG. 1 to perform the method for offsetting measurement of machine tools in the Z axial direction. Steps of performing the method for offsetting measurement of machine tools in the Z axial direction are described hereinafter.

A total tool seat assembling length L1 of each of the tool seats 20 are stored in the machine storage unit 13 beforehand. The total tool length L2 of each of the tools 21 are stored in the tool storage unit 14 beforehand. One of the tool seats 20 is chosen from the tool seats 20 of the machine (not shown in the drawing). The first coordinate A is set based on the first datum mark of the tool seat 20. The total tool seat assembling length L1 in between the first datum mark of the tool seat 20 and an end surface 201 of the tool seat 20 along the Z axial direction is obtained. Then, the total tool seat assembling length L1 of each of the tool seats 20 are stored in the machine storage unit 13.

One of the tools 21 is further chosen and is installed in the tool seat 20. In the same way, the total tool length L2 of the tool 21 along the Z axial direction is obtained. The total tool length L2 of each of the tools 21 are stored in the tool storage unit 14.

The measuring unit 15 is provided and a second coordinate B is set by using a second datum mark of the measuring unit 15. The measuring unit 15 has a first datum plane 151. A coordinate value of the first datum plane 151 in the Z axial direction is set to be the same as a coordinate value of the second coordinate B in the Z axial direction. For example, when the coordinate of the second coordinate B is (xB, yB, zB), the first datum plane 151 is a plane of Z=zB.

The second datum mark of the measuring unit 15 is used as the second coordinate B, and the first coordinate A (the first datum mark) of the tool seat 20 and the second coordinate B (the second datum mark) are overlapped with each other virtually (namely, using a virtual means). The motion controlling unit 11 is used for controlling and moving the tool seat 20 along the Z axial direction to make the first machining end 211 of the tool 21 contact with the first datum plane 151. Therefore, the central processing unit 16 can obtain a relative total length L0 based on a difference value between the first coordinate A and the second coordinate B in the Z axial direction (as shown in FIG. 3).

In this disclosure, being virtually overlapped and virtual means are defined that to set coordinates of two datum marks to be the same.

Then, the central processing unit 16 obtains the total tool seat assembling length L1 of the tool seat 20 from the machine storage unit 13 and the total tool length L2 from the tool storage unit 14. The central processing unit 16 subtracts the total tool seat assembling length L1 from the relative total length L0 to obtain a tool assembling length L3. The central processing unit 16 subtracts the total tool length L2 from the relative total length L0 to obtain an assembled offset length L4.

Therefore, the actual tool assembling length L3 of the tool 21 and the assembled offset length L4 of the tool 21 installed in the tool seat 20 in an offset position along the Z axial direction is obtained. The tool assembling length L3 is inputted to the simulation unit 12, and the assembled offset length L4 is inputted to the motion controlling unit 11 and the simulation unit 12 by the central processing unit 16.

Figure 4:
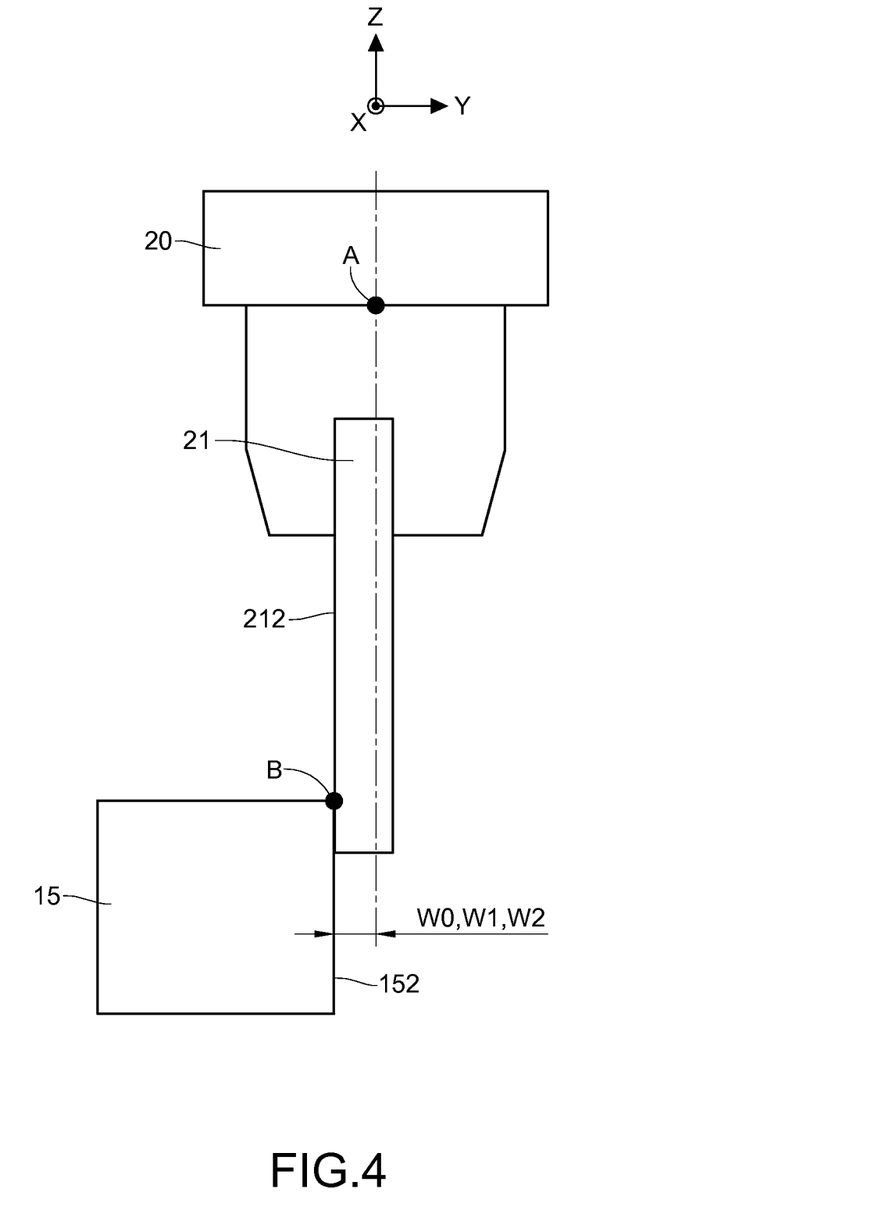
FIG. 4 is a schematic view of using the system for offsetting measurement of the machine tools in FIG. 1 to perform the method for offsetting measurement of the machine tools in a Y axial direction.

Please refer to FIG. 4, which is a schematic view of using the system 10 for offsetting measurement of machine tools in FIG. 1 to perform the method for offsetting measurement of the machine tools in the Y axial direction. Steps of performing the method for offsetting measurement of the machine tools in the Y axial direction are described hereinafter.

In the same way, the first coordinate A is set based on the first datum mark of the tool seat 20, and the second coordinate B is set by using the second datum mark of the measuring unit 15. The measuring unit 15 has a second datum plane 152. A coordinate value of the second datum plane 152 in the Y axial direction is the same as a coordinate value of the second coordinate B in the Y axial direction. For example, when the coordinate of the second coordinate B is (xB, yB, zB), the second datum plane 152 is a plane of Y=yB.

The second datum mark of the measuring unit 15 is used as the second coordinate B, and the first coordinate A (the first datum mark) of the tool seat 20 and the second coordinate B (the second datum mark) are overlapped with each other using a virtual means (i.e., virtually). The motion controlling unit 11 is used for controlling and moving the tool seat 20 along the Y axial direction to make the second machining end 212 of the tool 21 contact with the second datum plane 152. Therefore, the central processing unit 16 obtains a relative total length W0 based on a difference value between the first coordinate A and the second coordinate B in the Y axial direction.

Then, the central processing unit 16 obtains the total tool seat assembling length which is zero in the Y axial direction from the machine storage unit 13, and obtains the total tool length which is zero in the Y axial direction from the tool storage unit 14. Therefore, the central processing unit 16 obtains that a tool assembling length W1 equals to the relative total length W0 in the Y axial direction as well as obtaining that an assembled offset length W2 equals to the relative total length W0 in the Y axial direction.

Therefore, the tool assembling length W1 and the assembled offset length W2 of the tool 21 installed in an offset position along the Y axial direction are obtained. The tool assembling length W1 is inputted to the simulation unit 12 as well as the assembled offset length W2 is inputted to the motion controlling unit 11 and the simulation unit 12 by the central processing unit 16.

Furthermore, when the system 10 for offsetting measurement of the machine tools performs the method for offsetting measurement of the machine tools in the X axial direction, it can be performed based on the same way of performing the above-mentioned method for offsetting measurement of the machine tools in the Y axial direction.

The central processing unit 16 calculates the tool assembling lengths L3 and W1 as well as the assembled offset lengths L4 and W2 in each of the axial directions and provides them for the simulation unit 12 to compute. Then, during the 3D simulated drawing process of machining and collision prevention of the tool seat 20 and its tool 21 by the computing unit 121, offset compensation and rectification are preformed for each of the axial directions based on the tool assembling lengths L3 and W1 as well as the assembled offset lengths L4 and W2 in each of the axial directions in order to obtain more precise simulation results. Then, the simulation results are shown by the display unit 122 of the simulation unit 12.

After the central processing unit 16 inputs the assembled offset lengths L4 and W2 in each of the axial directions to the motion controlling unit 11, more precise actual position of the tool 21 is obtained when the motion controlling unit 11 controls the tool 21 to perform machining, and the offset value for machining is rectified and corrected by using the assembled offset lengths L4 and W2. Thereby, more precise machining results are obtained when the tool 21 performs machining.

Figure 5:
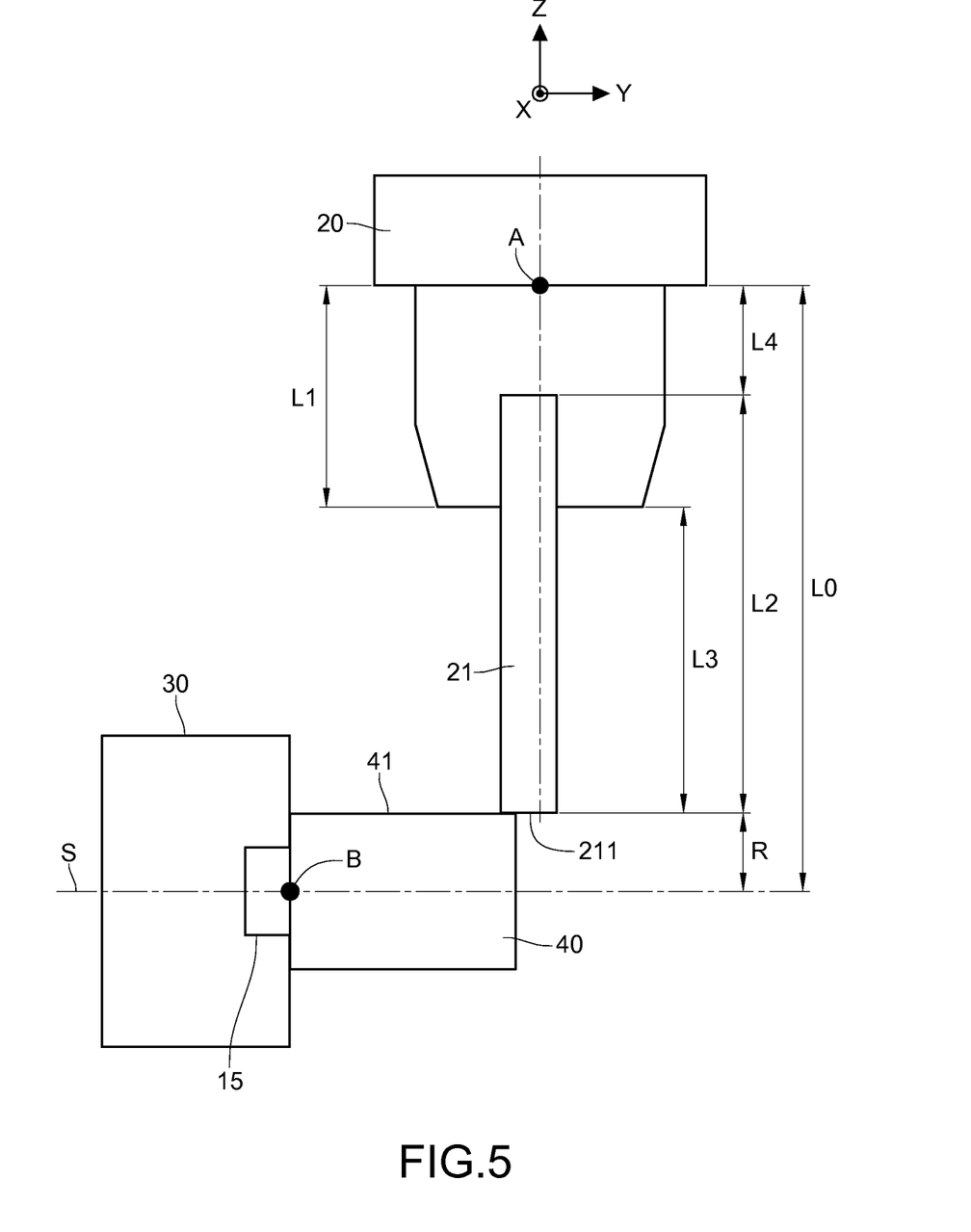
FIG. 5 is a schematic view of using the system for offsetting measurement of the machine tools to perform the method for offsetting measurement of the machine tools in the Z axial direction according to another embodiment of the disclosure.

Please refer to FIG. 5, which is a schematic view of using the system for offsetting measurement of the machine tools to perform the method for offsetting measurement of the machine tools in the Z axial direction according to another embodiment of the disclosure. In this embodiment, the system for offsetting measurement of the machine tools is roughly the same as the system 10 for offsetting measurement of the machine tools in FIG. 1. The differences are that the measuring unit 15 in this embodiment is disposed in a gripper 30, and the second coordinate B of the measuring unit 15 is located at a second datum mark of the gripper 30. A workpiece 40 is also gripped by the gripper 30. An axis S of the workpiece 40 is overlapped with the second coordinate B of the measuring unit 15. The workpiece 40 has a workpiece length D and a workpiece radius R.

In this embodiment, the motion controlling unit 11 controls the tool seat 20 to make the first coordinate A and the second coordinate B overlapped with each other at a coordinate in the Z axial direction by using a virtual means. Then, the motion controlling unit 11 controls the tool seat 20 to move along the Z axial direction, so as to make the first machining end 211 of the tool 21 contact with a lateral side 41 of the workpiece 40. Therefore, the central processing unit 16 is used for obtaining the relative total length L0 based on a difference value between the first coordinate A and the second coordinate B in the Z axial direction. Moreover, the central processing unit 16 is used for obtaining the total tool seat assembling length L1 of the tool seat 20 in the Z axial direction from the machine storage unit 13, and for obtaining the total tool length L2 in the Z axial direction from the tool storage unit 14. The central processing unit 16 is used for subtracting the total tool seat assembling length L1 in the Z axial direction and the workpiece radius R of the workpiece 40 from the relative total length L0 in the Z axial direction to obtain the tool assembling length L3 in the Z axial direction. The central processing unit 16 is also used for subtracting the total tool length L2 in the Z axial direction and the workpiece radius R of the workpiece 40 from the relative total length L0 in the Z axial direction to obtain the assembled offset length L4 in the Z axial direction. Therefore, the tool assembling length L3 and the assembled offset length L4 are obtained by performing the method in the Z axial direction. The tool assembling length L3 in the Z axial direction is inputted to the simulation unit 12, and the assembled offset length L4 in the Z axial direction is inputted to the motion controlling unit 11 and the simulation unit 12 by the central processing unit 16.

Figure 6:
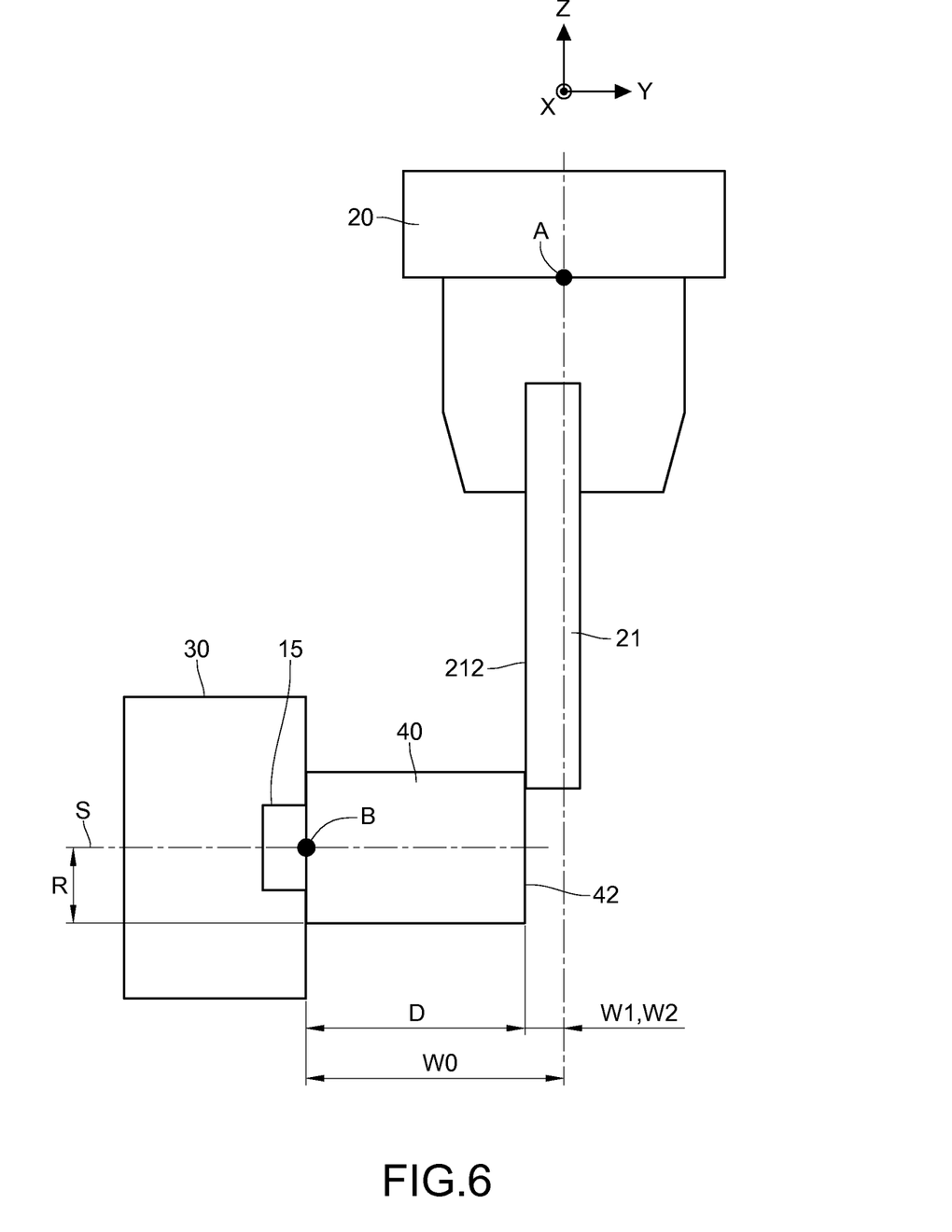
FIG. 6 is a schematic view of using the system for offsetting measurement of the machine tools in FIG. 5 to perform the method for offsetting measurement of the machine tools in the Y axial direction.

Please refer to FIG. 6, which is a schematic view of using the system for offsetting measurement of the machine tools in FIG. 5 to perform the method for offsetting measurement of the machine tools in the Y axial direction. The motion controlling unit 11 is used for controlling the tool seat 20 to make the first coordinate A and the second coordinate B overlapped with each other at a coordinate in the Y axial direction using a virtual means. Then, the motion controlling unit 11 controls the tool seat 20 to move along the Y axial direction in order to make the second machining end 212 of the tool 21 contact with an end surface 42 of the workpiece 40. Therefore, the central processing unit 16 is able to obtain the relative total length W0 based on a difference value between the first coordinate A and the second coordinate B in the Y axial direction. The central processing unit 16 obtains that the total tool seat assembling length is zero in the Y axial direction from the machine storage unit 13 as well as obtaining that the total tool length is zero in the Y axial direction from the tool storage unit 14. The central processing unit 16 is used for subtracting the total tool seat assembling length in the Y axial direction and the workpiece length D of the workpiece 40 from the relative total length W0 in the Y axial direction to obtain the tool assembling length W1 in the Y axial direction. The central processing unit 16 is also used for subtracting the total tool length in the Y axial direction and the workpiece length D of the workpiece 40 from the relative total length W0 in the Y axial direction to obtain the assembled offset length W2 which is equal to the tool assembling length W1 in the Y axial direction. Therefore, the tool assembling length W1 and the assembled offset length W2 in the Y axial direction are obtained by performing the method for offsetting measurement of the machine tools in the Y axial direction. The tool assembling length W1 in the Y axial direction is inputted to the simulation unit 12, and the assembled offset length W2 in the Y axial direction is inputted to the motion controlling unit 11 and the simulation unit 12 by the central processing unit 16.

Furthermore, when the system for offsetting measurement of the machine tools performs the method for offsetting measurement of the machine tools in the X axial direction, it can be performed based on the same way of performing the above-mentioned method in the Y axial direction.

As a conclusion from the above, according to the method for offsetting measurement and its system of machine tools provided by the present disclosure, both the actual tool assembling length and the assembled offset length are obtained when the relative total length is measured once. Therefore, a measuring time of the method for offsetting measurement of the machine tools is saved. The simulation unit is able to draw 3D simulated machining process and results based on the tool assembling length and the assembled offset length. The motion controlling unit is able to rectify an offset value of machining based on the assembled offset length. Therefore, precisions of simulation and machining in using the tool for machining are enhanced by the method for offsetting measurement and its system for machine tools.

What is claimed is:

1. A method for offsetting measurement of a machine tool, comprising steps of:
   choosing at least a tool seat, setting a first coordinate based on a first datum mark of the tool seat, and wherein there is a total tool seat assembling length in between the first datum mark of the tool seat and an end surface of the tool seat;
   choosing at least a tool, assembling the tool in the tool seat, and the tool including a total tool length;
   providing a measuring unit, and setting a second coordinate based on a second datum mark of the measuring unit;
   moving the tool seat along at least an axial direction to make a machining end of the tool contact with the second coordinate, so as to obtain a relative total length in between the first coordinate and the second coordinate in the axial direction; and
   subtracting the total tool length from the relative total length to obtain an assembled offset length, and subtracting the total tool seat assembling length from the relative total length to obtain a tool assembling length.

2. The method as claimed in claim 1, further comprising:
   storing the total tool seat assembling length by a machine storage unit beforehand.

3. The method as claimed in claim 2, further comprising:
   obtaining the total tool seat assembling length from the machine storage unit by a central processing unit.

4. The method as claimed in claim 1, further comprising:
   storing the total tool length by a tool storage unit.

5. The method as claimed in claim 4, further comprising:
   obtaining the total tool length from the tool storage unit by a central processing unit, and subtracting the total tool length from the relative total length to obtain the assembled offset length.

6. The method as claimed in claim 1, wherein the measuring unit has a datum plane, a coordinate value of the datum plane relative to the axial direction is the same as a coordinate value of the second coordinate relative to the axial direction, and the machining end of the tool is in contact with the datum plane while contacting with the second coordinate in order to obtain the relative total length in between the first coordinate and the second coordinate in the axial direction.

7. The method as claimed in claim 1, further comprising:
   providing a simulation unit for showing simulated movements of the tool and the tool seat based on the tool assembling length and the assembled offset length.

8. The method as claimed in claim 1, further comprising:
   providing a motion controlling unit for controlling displacement movements of the tool seat based on the assembled offset length during a machining process.

9. The method as claimed in claim 1, further comprising:
   providing a gripper for gripping a workpiece, wherein the measuring unit is disposed in the gripper, and a dimension is formed in between an edge of the workpiece and the second coordinate along the axial direction.

10. The method as claimed in claim 9, wherein the machining end of the tool is made to contact with the workpiece so as to obtain the relative total length in between the first coordinate and the second coordinate in the axial direction.

11. The method as claimed in claim 10, further comprising:
    subtracting the total tool length and the dimension of the workpiece from the relative total length to obtain the assembled offset length, and subtracting the total tool seat assembling length and the dimension of the workpiece from the relative total length to obtain the tool assembling length.

12. An offsetting measurement system of a machine tool, having at least a tool being installed in at least a tool seat, the system comprising:
- a motion controlling unit for controlling displacement movements of the tool seat;
- a simulation unit for displaying simulating movements of the tool and the tool seat;
- a machine storage unit for storing a total tool seat assembling length of the tool seat;
- a tool storage unit for storing a total tool length of the tool; and
- a measuring unit for measuring actual positions of the tool and the tool seat, for obtaining a tool assembling length based on the total tool seat assembling length and inputting the tool assembling length to the simulation unit, and for obtaining an assembled offset length based on the total tool length and inputting the assembled offset length to the motion controlling unit and the simulation unit.

13. The system as claimed in claim 12, wherein the simulation unit comprises a computing unit and a display unit, the computing unit is used for simulating simulated movements of the tool and the tool seat, and the display unit is used for showing the simulated movements of the tool and the tool seat.

14. The system as claimed in claim 12, further comprising a central processing unit for performing interference inspection, obtaining the total tool seat assembling length from the machine storage unit, obtaining the tool assembling length based on the total tool seat assembling length, inputting the tool assembling length to the simulation unit, obtaining the total tool length from the tool storage unit, obtaining the assembled offset length based on the total tool length, and for inputting the assembled offset length to the motion controlling unit and the simulation unit.

\* \* \* \* \*